United States Patent
Otsu et al.

(10) Patent No.: US 8,018,822 B2
(45) Date of Patent: Sep. 13, 2011

(54) OPTICAL INFORMATION RECORDING MEDIUM

(75) Inventors: Takeshi Otsu, Gunma (JP); Fumi Hara, Gunma (JP); Shinichi Kojo, Gunma (JP); Atsuo Shimizu, Gunma (JP); Motomitsu Hagiwara, Gunma (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 832 days.

(21) Appl. No.: 11/871,361

(22) Filed: Oct. 12, 2007

(65) Prior Publication Data

US 2008/0107007 A1    May 8, 2008

(30) Foreign Application Priority Data

Oct. 13, 2006  (JP) .................................. 2006-280653

(51) Int. Cl.
*G11B 7/24* (2006.01)

(52) U.S. Cl. .................................................. 369/275.1

(58) Field of Classification Search .......................... None
See application file for complete search history.

(56) References Cited

U.S. PATENT DOCUMENTS

| 6,128,273 | A  | * | 10/2000 | Horie et al. ................ 369/275.4 |
| 6,169,721 | B1 | * | 1/2001  | Takishita et al. ........... 369/275.4 |
| 2007/0261068 | A1 | * | 11/2007 | Yoshihiro et al. ............. 720/718 |
| 2008/0013440 | A1 | * | 1/2008  | Yamamoto et al. ........ 369/275.4 |
| 2008/0123504 | A1 | * | 5/2008  | Kakuta et al. .................... 369/94 |

FOREIGN PATENT DOCUMENTS

| CN | 1848264 A    | 10/2006 |
| JP | 2004-139697  | 5/2004  |
| JP | 2006-294196 A | 10/2006 |

* cited by examiner

*Primary Examiner* — Joseph Feild
*Assistant Examiner* — Henok Heyi
(74) *Attorney, Agent, or Firm* — Law Office of Katsuhiro Arai

(57) ABSTRACT

An optical information recording medium includes an optical disk body including a light-transmitting substrate, a recording layer provided on a main surface of the light-transmitting substrate over a region in which pre-grooves are formed and a portion of a region in which dummy grooves are formed, and a reflecting layer provided over the recording layer and a region of the light-transmitting substrate in which the recording layer is not provided; and an ink receiving layer provided on the label surface side of the optical disc body. The dummy grooves provided in at least a portion of the region in which the dye material is not applied have a pitch larger than that of the pre-grooves, are shallower than that of the pre-grooves, or have half-width less than that of the pre-grooves.

13 Claims, 3 Drawing Sheets

OPTICAL INFORMATION RECORDING MEDIUM

BACKGROUND OF THE INVENTION

1. Field of the Invention

The present invention relates to a disc-shaped optical information recording medium in which printing and drawing can be performed on the label surface (opposite to a light incidence plane) side thereof. Specifically, the present invention relates to an optical information recording medium of a type in which a printing and drawing region is extended to the inner peripheral side inside an information recording region for recording information by laser beam irradiation.

2. Description of the Related Technology

Disc-shaped optical information recording media such as CD-R, DVD±R, HD-DVD-R, and BD (blue-ray disc) have a structure in which a recording layer and a reflecting layer are formed on one of the surfaces of a light-transmitting substrate so that data can be recorded on the recording layer by laser beam irradiation of the other surface of the light-transmitting substrate. Also, in each of these optical information recording media, the surface opposite to the surface to be irradiated with a laser beam is generally used as a label surface on which a character, a symbol, a figure, a pattern, or a combination thereof is displayed as visible information by printing or the like.

Various types of optical information recording media have been proposed in which the display is performed with an ink jet printer or the like. For example, Japanese Unexamined Patent Application Publication No. 2004-139697 proposes an optical information recording medium including a disc-shaped light-transmitting substrate in which dummy grooves and a reflecting layer are provided in a portion corresponding to a clamping area, and an image forming layer is provided in a portion corresponding to a reflecting layer or another area of the substrate. The clamping area is provided around a central hole having a radius of 7.5 mm within a range from the center of the light-transmitting substrate to a radius of less than 22 mm. An information recording area is provided outside the clamping area, pre-grooves for tracking guide being formed in the information recording area.

However, in order to extend the image forming region of the above-described optical information recording medium, for example, as shown in FIG. 5, a reflecting layer 4 is provided on a recording layer 3 so that the inner peripheral side thereof extends to dummy grooves 2b beyond the inner peripheral edge 3a of the recording layer 3. In this case, grooves 4b formed in the surface of the reflecting layer 4 which is provided, without through the recording layer, on the region in which the dummy grooves 2b are formed is deeper than the grooves 4a formed in the surface of the reflecting layer 4 which is provided, through the recording layer 3, on the region in which pre-grooves 2a are formed. Therefore, the intensity of reflection of visible light from the surface (per unit area) of the reflecting layer 4 provided on the dummy grooves 2b is lower than that from the surface of the reflecting layer 4 provided on the pre-grooves 2a. Therefore, there occurs the problem of producing an annular portion with decreased brightness near the inner peripheral edge (a portion adjacent to a mirror portion 4d) of an ink-receiving layer as seen from the label surface side.

SUMMARY OF THE INVENTION

Accordingly, it is an object of the present invention to provide an optical information recording medium capable of decreasing a difference in brightness as seen from the label surface side.

In accordance with a first embodiment of the present invention, an optical information recording medium includes a hole at the center thereof, a light-transmitting substrate on one of the main surfaces of which pre-grooves are provided in an information recording area and dummy grooves are provided in an inner peripheral region inside the information recording area, a recording layer provided on the main surface of the light-transmitting substrate by applying a dye material on the region where the pre-grooves are formed and on a portion of the region in which the dummy grooves are formed, and a reflecting layer provided over the recording layer and the region of the light-transmitting substrate in which the dye material is not applied, the surface of the reflecting layer having grooves reflecting the pre-grooves and grooves reflecting the dummy grooves. In the light-transmitting substrate, the pitch of the dummy grooves provided in at least a portion of the region in which the dummy grooves are formed but the dye material is not applied is larger than that of the pre-grooves in the information recording area. Therefore, the object of the present invention can be achieved.

In the light-transmitting substrate according to the first embodiment, the pitch of the dummy grooves provided in at least a portion of the region in which the dummy grooves are formed but the dye material is not applied is larger than that of the pre-grooves in the information recording area, thereby decreasing a difference in intensity of reflection of visible light per unit area between the surface of the reflecting layer provided, through the recording layer, on the region where the pre-grooves are formed and the surface of the reflecting layer provided on region in which the dummy grooves are formed but the dye material is not applied.

More specifically, there is decreased the presence ratio (per unit area) of the grooves which decrease the intensity of reflection of visible light (per unit area) from the surface of the reflecting layer provided on the region in which the dummy grooves are formed but the dye material is not applied as compared with the surface of the reflecting layer provided, through the recording layer, on the region where the pre-grooves are formed, thereby decreasing a degree of decrease in reflection of visible light (per unit area).

Therefore, a difference in brightness as seen from the label surface side can be reduced.

In accordance with a second embodiment of the present invention, in addition to the first embodiment, the pitch of the dummy grooves provided in the region of the light-transmitting substrate in which the dummy grooves are formed but the dye material is not applied is larger than that of the pre-grooves in the information recording area. Therefore, the object of the present invention can be achieved.

In this case, in the light-transmitting substrate, it is possible to effectively decrease the degree of decrease in reflection of visible light (per unit area) due to the grooves reflecting the dummy grooves on the surface of the reflecting layer which is formed on the region in which the dummy groups are formed but the dye material is not applied.

In accordance with a third embodiment of the present invention, an optical information recording medium includes a hole at the center thereof, a light-transmitting substrate on one of the main surfaces of which pre-grooves are provided in an information recording area and dummy grooves are provided in an inner peripheral region inside the information recording area, a recording layer provided on the main surface of the light-transmitting substrate by applying a dye material on the region where the pre-grooves are formed and on a portion of the region in which the dummy grooves are formed, and a reflecting layer provided over the recording layer and the region of the light-transmitting substrate on which the dye material is not applied, the surface of the reflecting layer having grooves reflecting the pre-grooves and grooves reflecting the dummy grooves. In the light-transmitting substrate, the dummy grooves provided in the region in which the dummy grooves are formed but the dye material is not applied is shallower than the pre-grooves in the information recording area. Therefore, the object of the present invention can be achieved.

In the light-transmitting substrate according to the third embodiment, the dummy grooves provided in the region in which the dummy grooves are formed but the dye material is not applied is shallower than the pre-grooves in the information recording area, thereby decreasing a difference in intensity of reflection of visible light per unit area between the surface of the reflecting layer provided, through the recording layer, on the region where the pre-grooves are formed and the surface of the reflecting layer provided on the region in which the dummy grooves are formed but the dye material is not applied.

More specifically, there is decreased the depth of the grooves which decrease the reflection intensity of visible light (per unit area) from the surface of the reflecting layer provided on the region in which the dummy grooves are formed but the dye material is not applied as compared with the reflection intensity of visible light (per unit area) from the surface of the reflecting layer provided, through the recording layer, on the region where the pre-grooves are formed, thereby decreasing a degree of decrease in reflection of visible light (per unit area).

In accordance with a fourth embodiment of the present invention, an optical information recording medium includes a hole at the center thereof, a light-transmitting substrate on one of the main surfaces of which pre-grooves are provided in an information recording area and dummy grooves are provided in an inner peripheral region inside the information recording area, a recording layer provided on the main surface of the light-transmitting substrate by applying a dye material on the region where the pre-grooves are formed and on a portion of the region where the dummy grooves are formed, and a reflecting layer provided over the recording layer and the region of the light-transmitting substrate in which the dye material is not applied, the surface of the reflecting layer having grooves reflecting the pre-grooves and grooves reflecting the dummy grooves. In the light-transmitting substrate, the half-width (the width of the grooves at half depth) of the dummy grooves provided in the region in which the dummy grooves are formed but the dye material is not applied is smaller than that of the pre-grooves in the information recording area. Therefore, the object of the present invention can be achieved.

In the light-transmitting substrate according to the fourth embodiment, the half-width of the dummy grooves provided in the region in which the dummy grooves are formed but the dye material is not applied is smaller than that of the pre-grooves in the information recording area, thereby decreasing a difference in reflection intensity of visible light per unit area between the surface of the reflecting layer provided, through the recording layer, on the region where the pre-grooves are formed and the surface of the reflecting layer provided on the region in which the dummy grooves are formed but the dye material is not applied.

More specifically, there is decreased the presence ratio of the grooves which decrease the reflection intensity of visible light (per unit area) from the surface of the reflecting layer provided on the region in which the dummy grooves are formed but the dye material is not applied as compared with the reflection intensity of visible light (per unit area) from the surface of the reflecting layer provided, through the recording layer, on the region where the pre-grooves are formed, thereby decreasing a degree of decrease in reflection of visible light (per unit area).

Therefore, a difference in brightness as seen from the label surface side can be reduced.

In accordance with a fifth embodiment of the present invention, in addition to any one of the first to fourth embodiments, the light-transmitting substrate further includes a region in which the dummy grooves are formed inside at least the inner peripheral edge of the reflecting layer. Therefore, the object of the present invention can be achieved.

In accordance with the fifth embodiment, it is possible to suppress the occurrence of a region in which reflection of visible light is enhanced near the inner peripheral edge of the reflecting layer. Therefore, a difference in brightness as seen from the label surface side is not noticeable for a user.

The above-mentioned object and other objects, components, features, operations, and advantages of the present invention will be made clear from the description below and the attached drawings.

DESCRIPTION OF THE PREFERRED EMBODIMENTS

Figure 1:
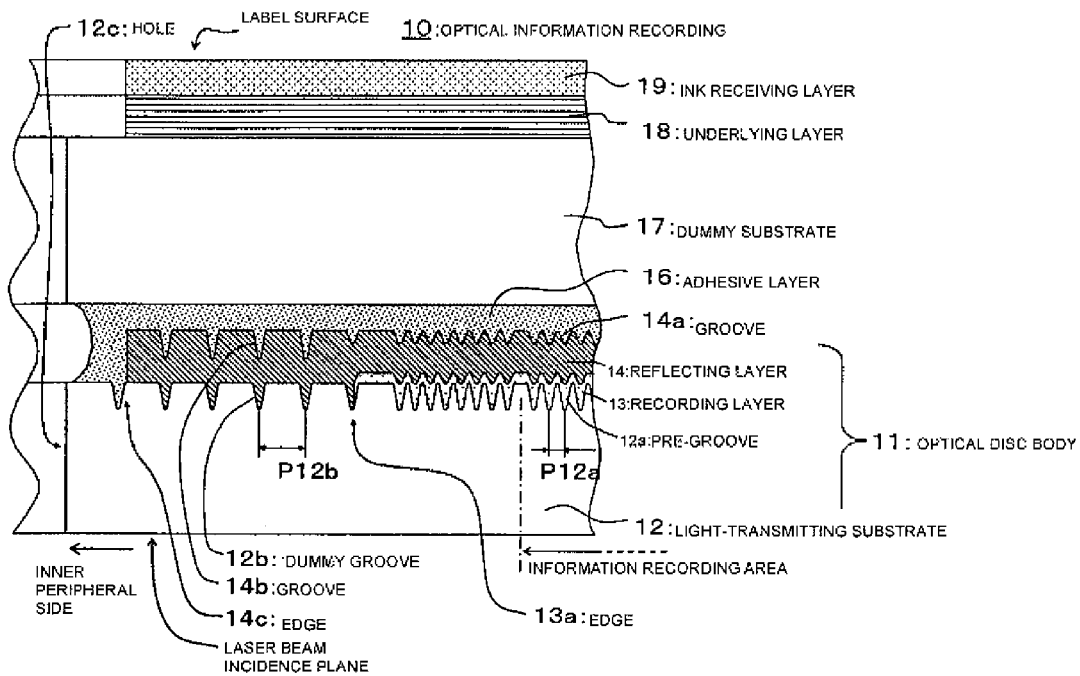
FIG. 1 is an enlarged partial sectional view schematically showing the internal structure of an optical information recording medium according to a first embodiment of the present invention.

An optical information recording medium according to a first embodiment of the present invention will be described with reference to FIG. 1. FIG. 1 is an enlarged partial sectional view schematically showing the internal structure of an optical information recording medium 10 according to the first embodiment.

As shown in FIG. 1, the optical information recording medium 10 according to the first embodiment has a structure of a DVD-R, including an optical disc body 11, a dummy substrate 17 provided on the optical disc body 11 through an adhesive layer 16, and an underlying layer 18 and an ink receiving layer 19 provided on the dummy substrate 17.

More specifically, the optical disc body 11 includes a hole 12c at the center and a light-transmitting substrate 12 on one of the main surfaces of which pre-grooves 12a are provided in an information recording area and dummy grooves 12b are provided in an inner peripheral region inside the information recording area. In addition, a recording layer 13 is provided on the main surface of the light-transmitting substrate 12 by applying a dye material on the region in which the pre-grooves 12a are formed and on a portion of the region in which the dummy grooves 12b are formed. Further, a reflecting layer 14 is provided over the recording layer 13 and the region in which the dummy grooves 12b are formed but the dye material is not applied, beyond the inner peripheral edge 13a of the recording layer 13. The surface of the reflecting layer 14 has grooves 14a reflecting the pre-grooves 12a and grooves 14b reflecting the dummy grooves 12b. In the light-transmitting substrate 12, the pitch P12b of the dummy grooves 12b provided in at least a portion of the region in which the dummy grooves 12b are formed but the dye material is not applied is larger than the pitch P12a of the pre-grooves 12a in the information recording area.

In this embodiment, in the light-transmitting substrate 12, the pitch P12b of the dummy grooves 12b provided in the region in which the dummy grooves 12b are formed but the dye material is not applied is larger than the pitch P12a of the pre-grooves 12a in the information recording area.

In this embodiment, the light-transmitting substrate 12 has a region in which the dummy grooves 12b are further formed inside at least the inner peripheral edge 14c of the reflecting layer 14.

The light-transmitting substrate 12 is preferably as follows: The light-transmitting substrate 12 is made of a transparent resin such as polycarbonate, polymethyl methacrylate), an acrylic resin, or the like, and is formed in a predetermined shape (in the case of an optical disc, a doughnut-like shape) by a method such as injection molding. The resin is not limited to these, and an ultraviolet curable resin can be used. The thickness is preferably less than 0.6 mm.

The pre-grooves 12a are preferably as follows: The pre-grooves 12a are preferably formed at the same time as injection molding of the light-transmitting substrate 12. The standard pitch is 0.74 μm.

The dummy grooves 12b are preferably as follows: The dummy grooves 12b can be provided continuously from or independently of the pre-grooves 12a in the inner peripheral region inside the pre-grooves 12a. Also, like the pre-grooves 12a, the dummy grooves 12b may be spirally continuous from the inner periphery to the outer periphery. However, the dummy grooves 12b are not limited to these, and for example, a plurality of annular grooves may be concentrically arranged. Like the pre-grooves 12a, the dummy grooves 12b are preferably formed at the same time as injection molding of the light-transmitting substrate 12.

The recording layer 13 is preferably as follows: The recording layer 13 contains an organic dye so that a pit is formed by irradiation of a laser beam at a predetermined wavelength to record data. The organic dye is preferably a phthalocyanine dye, a cyanine dye, or an azo dye. The recording layer 13 is capable of recording and/or reproduction of data information, such as music, an image, and a computer program, by irradiation of the laser beam. The recording layer 13 is preferably provided by applying a dye material such as a solution or ink containing the dye on the light-transmitting substrate 12 using a method such as a screen printing method, a spin coating method, or the like.

The reflecting layer 14 is preferably as follows: The reflecting layer 14 reflects a laser beam for data recording and/or reproduction and preferably includes a metal film of Au, Al, Ag, Cu, or Pd, an alloy film of any one of these metals, or an alloy film containing any one of these metals and a minor component. The reflecting layer 14 is formed on the recording layer by a method such as sputtering or vacuum deposition.

The adhesive layer 16 is preferably as follows: The adhesive layer 16 preferably contains an epoxy or other reactive curable resin as a main component. The adhesive layer 16 is applied on the recording layer of the optical disc body and/or the lower surface of the dummy substrate by a method such as a spin coating method or a screen printing method. Then, the optical disc body and the dummy substrate are bonded together with the adhesive layer 16 to obtain a disc-shaped optical information recording medium including two substrates which are bonded together.

The dummy substrate 17 is preferably as follows: The same material as that for the light-transmitting substrate 12 can be used for the dummy substrate 17. Therefore, the information recording area formed on the light-transmitting substrate 12 can be integrated with the underlying layer 18 and the ink-receiving layer 19 which are formed on the dummy substrate 17 using a bonding process of DVD-R.

The underlying layer 18 is preferably as follows: The underlying layer 18 preferably contains an ultraviolet curable resin and a pigment as a main component. For example, the underlying layer 18 can be formed by printing ultraviolet curable ink containing an ultraviolet curable resin and a pigment using a method such as screen printing or spin coating and then curing the printed film with ultraviolet light. When the adhesive layer 16, the dummy substrate 17, and the ink-receiving layer 19 which will be described below are transparent, the underlying layer 18 is preferably provided for preventing the exposure of a metallic luster surface of the reflecting layer 14.

Next, the ink-receiving layer 19 is preferably as follows: The ink-receiving layer 19 preferably contains an ultraviolet curable resin as a main component. For example, ultraviolet curable ink prepared by mixing the ultraviolet curable resin, a binder component, a viscosity adjuster, a pigment, and other components is printed by a method such as screen printing or spin coating and then cured by irradiation of ultraviolet light to form the ink-receiving layer 19 on the dummy substrate 17 directly or through the underlying layer 18.

Examples of the pigment include organic and inorganic coloring pigments, inorganic fillers such as silica, alumina, aluminum hydroxide, and clay, and organic fillers such as acrylic beads, nylon beads, and rubber fine particles. These pigments may be used alone or in combination of any ones of these pigments.

Next, the pitch P12b of the dummy grooves 12b is preferably as follows: The pitch P12b of at least some of the dummy grooves 12b is preferably larger than the pitch P12a (standard, 0.74 μm) of the pre-grooves 12a. Specifically, the pitch P12b is preferably 2 times or more as large as the pitch P12a of the pre-grooves 12a. When the pitch P12b is smaller than this, an expected effect cannot be obtained, and thus the pitch P12b is preferably 1.5 μm or more. In this embodiment, the pitch P12b is 3.0 μm, but is not limited to this and may be a larger value. When the pitch P12b is excessively large, it is difficult to concentrically form the inner peripheral edge when the recording layer described below is deposited by, for example, a spin coating method. Therefore, the pitch P12b is preferably 300 μm or less. More preferably, all the dummy grooves 12b are formed at the pitch P12b which is 2 times or more as large as the pitch P12a (standard 0.74 μm) of the pre-grooves 12a.

Although all the dummy grooves 12b are preferably formed at the same pitch P12b, the pitch P12b is not limited to this. For example, the pitch P12b may be larger than the pitch P12a of the pre-grooves 12a for every plurality of the dummy grooves 12b.

Figure 2:
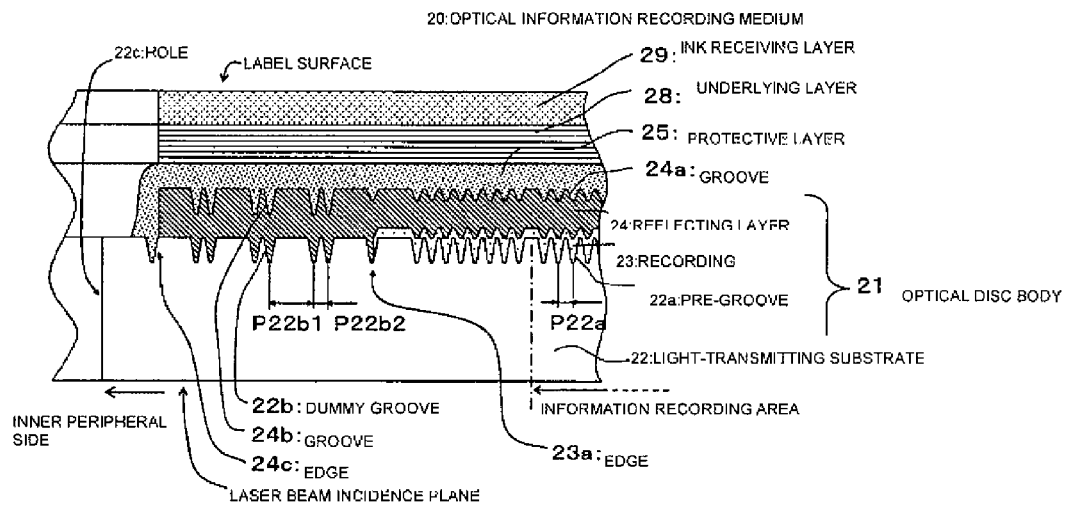
FIG. 2 is an enlarged partial sectional view schematically showing the internal structure of an optical information recording medium according to a second embodiment of the present invention.

Next, an optical information recording medium according to a second embodiment of the present invention will be described with reference to FIG. 2. FIG. 2 is an enlarged partial sectional view schematically showing the internal structure of an optical information recording medium 20 according to the second embodiment.

As shown in FIG. 2, the optical information recording medium 20 according to the second embodiment has a structure of a CD-R, including an optical disc body 21, a protective layer 25 provided on the optical disc body 21, and an underlying layer 28 and an ink receiving layer 29 provided on the protective layer 25. The second embodiment is different from the first embodiment in that the protective layer is provided instead of the adhesive layer, and the dummy substrate is not provided.

More specifically, the optical disc body 21 includes a hole 22c at the center and a light-transmitting substrate 22 on one of the main surfaces of which pre-grooves 22a are provided in an information recording area and dummy grooves 22b are provided on the internal peripheral side inside the information recording area. In addition, a recording layer 23 is provided on the main surface of the light-transmitting substrate 22 by applying a dye material over the region in which the pre-grooves 22a are formed and a portion of the region in which the dummy grooves 22b are formed. Further, a reflecting layer 24 is provided over the recording layer 23 and the region in which the dummy grooves 22b are formed but the dye material is not applied, beyond the inner peripheral edge 23a of the recording layer 23. The surface of the reflecting layer 24 has grooves 24a reflecting the pre-grooves 22a and grooves 24b reflecting the dummy grooves 22b. In the light-transmitting substrate 22, the pitch P22b1 of the dummy grooves 22b provided in at least a portion of the region in which the dummy grooves 22b are formed but the dye material is not applied is larger than the pitch P22a of the pre-grooves 22a in the information recording area.

More specifically, the dummy grooves 22b are formed at the pitch P22b1, which is larger than the pitch P22a of the pre-grooves for every plurality of dummy grooves 22b. For example, in the region in which the dummy grooves 22b are formed, there is a portion in which the dummy grooves 22b are formed at the increased pitch P22b1 (3.0 μm) and a portion in which the dummy grooves 22b are formed at the same pitch P22b2 as the pitch P22a (0.74 μm) of the pre-grooves 22a. The varying pitches P22b1 and P22b2 can be alternately arranged.

In this embodiment, the light-transmitting substrate 22 has a region in which the dummy grooves 22b are further formed inside at least the inner peripheral edge 24c of the reflecting layer 24.

The protective layer 25 is preferably as follows: The protective layer 25 is preferably formed by forming a resin film of a resin liquid containing an ultraviolet curable resin as a main component using a method such as a screen printing method or a spin coating method and then curing the resin film with ultraviolet light.

Since the other components, the operations, and advantages are the same as the first embodiment, description thereof is omitted.

Figure 3:
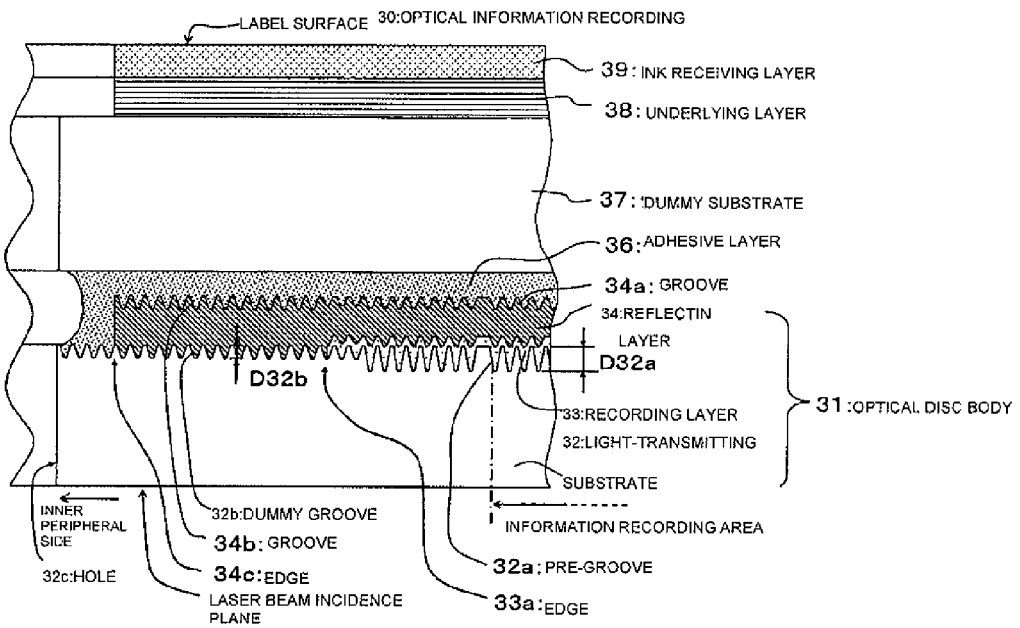
FIG. 3 is an enlarged partial sectional view schematically showing the internal structure of an optical information recording medium according to a third embodiment of the present invention.

Next, an optical information recording medium according to a third embodiment of the present invention will be described with reference to FIG. 3. FIG. 3 is an enlarged partial sectional view schematically showing the internal structure of an optical information recording medium 30 according to the third embodiment.

As shown in FIG. 3, the optical information recording medium 30 according to the third embodiment is the same as the first embodiment in that the optical information recording medium 30 has a structure of a DVD-R, including an optical disc body 31, a dummy substrate 37 provided on the optical disc body 31 through an adhesive layer 36, and an underlying layer 38 and an ink receiving layer 39 provided on the dummy substrate 37.

More specifically, the optical disc body 31 includes a hole 32c at the center and a light-transmitting substrate 32 on one of the main surfaces of which pre-grooves 32a are provided in an information recording area and dummy grooves 32b are provided in an inner peripheral region inside the information recording area. In addition, a recording layer 33 is provided on the main surface of the light-transmitting substrate 32 by applying a dye material over the region in which the pre-grooves 32a are formed and a portion of the region in which the dummy grooves 32b are formed. Further, a reflecting layer 34 is provided over the recording layer 33 and the region in which the dummy grooves 32b are formed but the dye material is not applied, beyond the inner peripheral edge 33a of the recording layer 33. The surface of the reflecting layer 34 has grooves 34a reflecting the pre-grooves 32a and grooves 34b reflecting the dummy grooves 32b. In the light-transmitting substrate 32, the depth D32b of the dummy grooves 32b provided in the region in which the dummy grooves 32b are formed but the dye material is not applied is smaller than the depth D32a of the pre-grooves 32a in the information recording area.

In this embodiment, the light-transmitting substrate 32 has a region in which the dummy grooves 32b are further formed inside at least the inner peripheral edge 34c of the reflecting layer 34.

Next, the depth D32b of the dummy grooves 32b is preferably as follows: The depth D32b of the dummy grooves 32b provided in the region of the light-transmitting substrate 32 in which the dummy grooves 32b are formed but the dye material is not applied is preferably smaller than the depth D32a of the pre-grooves 32a in the information recording area. Specifically, the depth D32b is preferably smaller than the depth D32a of the pre-grooves 32a. For example, when the depth D32a of the pre-grooves 32a is 140 nm, the depth D32b is preferably smaller than this.

Since the other components, operations, and advantages are the same as the first embodiment, description thereof is omitted.

Figure 4:
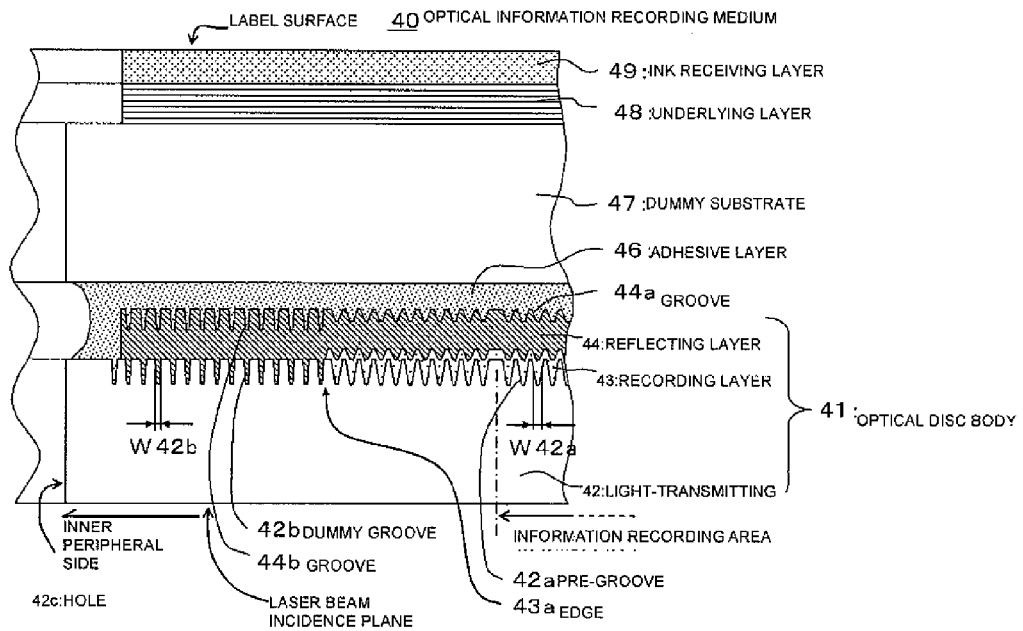
FIG. 4 is an enlarged partial sectional view schematically showing the internal structure of an optical information recording medium according to a fourth embodiment of the present invention.
Figure 5:
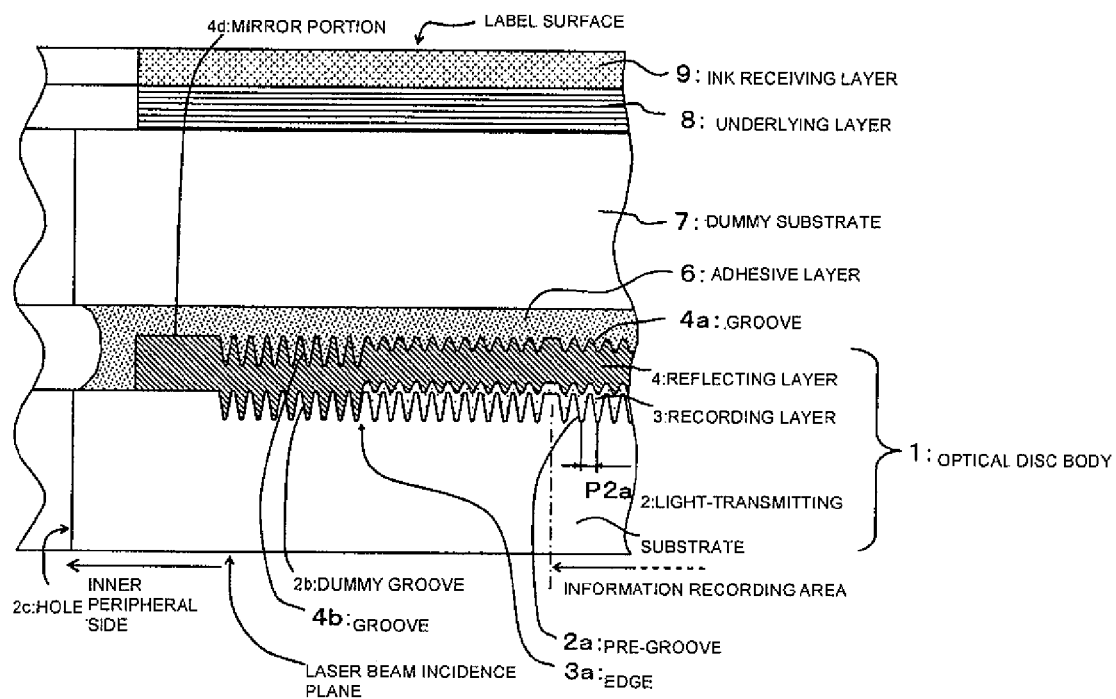
FIG. 5 is an enlarged partial sectional view illustrating a problem to be solved by the present invention.

Next, an optical information recording medium according to a fourth embodiment of the present invention will be described with reference to FIG. 4. FIG. 4 is an enlarged partial sectional view schematically showing the internal structure of an optical information recording medium 40 according to the fourth embodiment.

As shown in FIG. 4, the optical information recording medium 40 according to the fourth embodiment is the same as the first embodiment in that the optical information recording medium 40 has a structure of a DVD-R, including an optical disc body 41, a dummy substrate 47 provided on the optical disc body 41 through an adhesive layer 46, and an underlying layer 48 and an ink receiving layer 49 provided on the dummy substrate 47.

More specifically, the optical disc body 41 includes a hole 42c at the center and a light-transmitting substrate 42 on one of the main surfaces of which pre-grooves 42a are provided in an information recording area and dummy grooves 42b are provided in an inner peripheral region inside the information recording area. In addition, a recording layer 43 is provided on the main surface of the light-transmitting substrate 42 by applying a dye material over the region in which the pre-grooves 42a are formed and a portion of the region in which the dummy grooves 42b are formed. Further, a reflecting layer 44 is provided over the recording layer 43 and the inner peripheral region in which the dummy grooves 42b are formed but the dye material is not applied, beyond the inner peripheral edge 43a of the recording layer 43. The surface of the reflecting layer 44 has grooves 44a reflecting the pre-grooves 42a and grooves 44b reflecting the dummy grooves 42b. In the light-transmitting substrate 42, the half-width W42b of the dummy grooves 42b provided in the region in which the dummy grooves 42b are formed but the dye material is not applied is smaller than the half-width W42a of the pre-grooves 42a in the information recording area.

In this embodiment, the light-transmitting substrate 42 has a region in which the dummy grooves 42b are further formed inside at least the inner peripheral edge 44c of the reflecting layer 44.

Next, the half-width W42b of the dummy grooves 42b is preferably as follows: The half-width W42b of the dummy grooves 42b provided in the region of the light-transmitting substrate 42 in which the dummy grooves 42b are formed but the dye material is not applied is preferably smaller than the half-width W42a of the pre-grooves 42a in the information recording area. Specifically, the half-width W42b preferably is smaller than the half-width W42a of the pre-grooves 42a. For example, when the half-width W42a of the pre-grooves 42a is 0.35 μm, the half-width W42b preferably is smaller than this.

Since the other components, operations, and advantages are the same as the first embodiment, description thereof is omitted.

Although, in each of the embodiments, structure of a DVD-R or CD-R optical information recording medium is described, the present invention is not limited to this, and the present invention can be applied to DVD+R, HD-DVD, and BD (blue-ray disc) structure, and other various types of optical information recording media.

Although the embodiments relate to examples of an optical information recording medium including an optical disc body having a single recording layer, the present invention is not limited to these examples. For example, a plurality of light-transmitting substrates may be stacked in the thickness direction, and second recording layers and transflecting layers may be provided between the respective substrates to produce a so-called multilayer recording-system optical information recording medium including a plurality of recording layers.

In this case, among the plurality of light-transmitting substrates, dummy grooves are preferably provided in the light-transmitting substrate closest to the label surface side.

Further, when a plurality of recording layers is disposed in an optical disc body as described above, for example, a transparent resin layer may be provided as a light-transmitting substrates on the surface of another light-transmitting substrate on which the second recording layer and the transflecting layer are provided, and the pre-grooves and the dummy grooves may be formed in the transparent resin layer by pattern transfer.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording medium comprising:
a light-transmitting substrate on one of the main surfaces of which pre-grooves are provided circumferentially in an information recording area and dummy grooves other than the pre-grooves are provided circumferentially in an inner peripheral region outside the information recording area and closer to a center hole of the medium than is the information recording area;
a recording layer provided on a main surface of the light-transmitting substrate immediately over the pre-grooves, but not over at least some of the dummy grooves; and
a reflecting layer provided over the recording layer and immediately over the at least some of the dummy grooves without the recording layer, the surface of the reflecting layer having grooves which reflect the pre-grooves and grooves which reflect the dummy grooves;
wherein in the light-transmitting substrate, the pitch of the at least some of the dummy grooves is larger than that of the pre-grooves in the information recording area by a certain degree so as to increase intensity of reflection of visible light from a surface of the reflecting layer having the grooves which reflect the at least some of the dummy grooves.

2. The optical information recording medium according to claim 1, wherein in the light-transmitting substrate, the pitch of the dummy grooves provided in the region in which the dummy grooves are formed but the recording layer is not provided is larger than that of the pre-grooves in the information recording area.

3. The optical information recording medium of claim 2, wherein the light-transmitting substrate further includes a region in which at least one dummy groove is formed inside at least the internal peripheral edge of the reflecting layer.

4. The optical information recording medium of claim 1, wherein the pitch of the dummy grooves is at least two times as large as the pitch of the pre-grooves.

5. The optical information recording medium of claim 4, wherein the pitch of the dummy grooves is 300 μm or less.

6. The optical information recording medium of claim 1, wherein the light-transmitting substrate further includes a region in which at least one dummy groove is formed inside at least the internal peripheral edge of the reflecting layer.

7. An optical information recording medium comprising:
a light-transmitting substrate on one of the main surfaces of which pre-grooves are provided circumferentially in an information recording area and dummy grooves other than the pre-grooves are provided circumferentially in an inner peripheral region outside the information recording area and closer to a center hole of the medium than is the information recording area;
a recording layer provided on a main surface of the light-transmitting substrate immediately over the pre-grooves, but not over at least some of the dummy grooves; and
a reflecting layer provided over the recording layer and immediately over the at least some of the dummy grooves without the recording layer, the surface of the reflecting layer having grooves which reflect the pre-grooves and grooves which reflect the dummy grooves;
wherein in the light-transmitting substrate, the at least some of the dummy grooves are shallower than the pre-grooves in the information recording area by a certain degree so as to increase intensity of reflection of visible light from a surface of the reflecting layer having the grooves which reflect the at least some of the dummy grooves.

8. The optical information recording medium of claim 7, wherein the light-transmitting substrate further includes a region in which at least one dummy groove is formed inside at least the internal peripheral edge of the reflecting layer.

9. An optical information recording medium comprising:
a light-transmitting substrate on one of the main surfaces of which pre-grooves are provided circumferentially in an information recording area and dummy grooves are provided circumferentially in an inner peripheral region outside the information recording area and closer to a center hole of the medium than is the information recording area;
a recording layer provided on a main surface of the light-transmitting substrate immediately over the pre-grooves, but not over at least some of the dummy grooves; and
a reflecting layer provided over the recording layer and immediately over the at least some of the dummy grooves without the recording layer, the surface of the reflecting layer having grooves which reflect the pre-grooves and grooves which reflect the dummy grooves;
wherein in the light-transmitting substrate, the width of the grooves at half depth of the at least some of the dummy grooves is smaller than that of the pre-grooves in the information recording area by a certain degree so as to increase intensity of reflection of visible light from a surface of the reflecting layer having the grooves which reflect the at least some of the dummy grooves.

10. The optical information recording medium of claim 9, wherein the light-transmitting substrate further includes a region in which at least one dummy groove is formed inside at least the internal peripheral edge of the reflecting layer.

11. The optical information recording medium of claim 1, further comprising an ink receiving layer provided on the main surface of the light-transmitting substrate over the region in which the dummy grooves are formed.

12. The optical information recording medium of claim 7, further comprising an ink receiving layer provided on the main surface of the light-transmitting substrate over the region in which the dummy grooves are formed.

13. The optical information recording medium of claim 9, further comprising an ink receiving layer provided on the main surface of the light-transmitting substrate over the region in which the dummy grooves are formed.

* * * * *